United States Patent [19]

Missio

[11] 4,049,353
[45] Sept. 20, 1977

[54] SPECTROMETRIC SYSTEM AND CASSETTE

[75] Inventor: Danilo V. Missio, Belmont, Mass.

[73] Assignee: SpectraMetrics, Incorporated, Andover, Mass.

[21] Appl. No.: 713,436

[22] Filed: Aug. 11, 1976

[51] Int. Cl.² ............................ G01J 3/38; G01J 3/02
[52] U.S. Cl. ...................................... 356/85; 356/74; 356/98
[58] Field of Search ....................... 356/74, 75, 81, 85, 356/88, 96–98; 250/226; 350/301

[56] References Cited
U.S. PATENT DOCUMENTS

| | | | |
|---|---|---|---|
| 3,350,567 | 10/1967 | Strashiem | 250/226 |
| 3,752,585 | 8/1973 | Elliott | 356/98 |

FOREIGN PATENT DOCUMENTS 2,027,450  12/1971  Germany .............................. 356/98

Primary Examiner—F. L. Evans
Attorney, Agent, or Firm—Richard P. Crowley

[57] ABSTRACT

A spectrometric system for multielement analysis and a cassette for use in such system, the cassette having a plurality of aligned and nonaligned channels therethrough, each of which has an inlet and an outlet, the inlets in the focal plane of the spectrometer, and each outlet adjacent a photomultiplier tube, and optical transmission means within the cassette to transmit spectral emission radiation received by the nonaligned inlets through channels to the photomultiplier tubes adjacent the nonaligned outlets for such channels.

17 Claims, 5 Drawing Figures

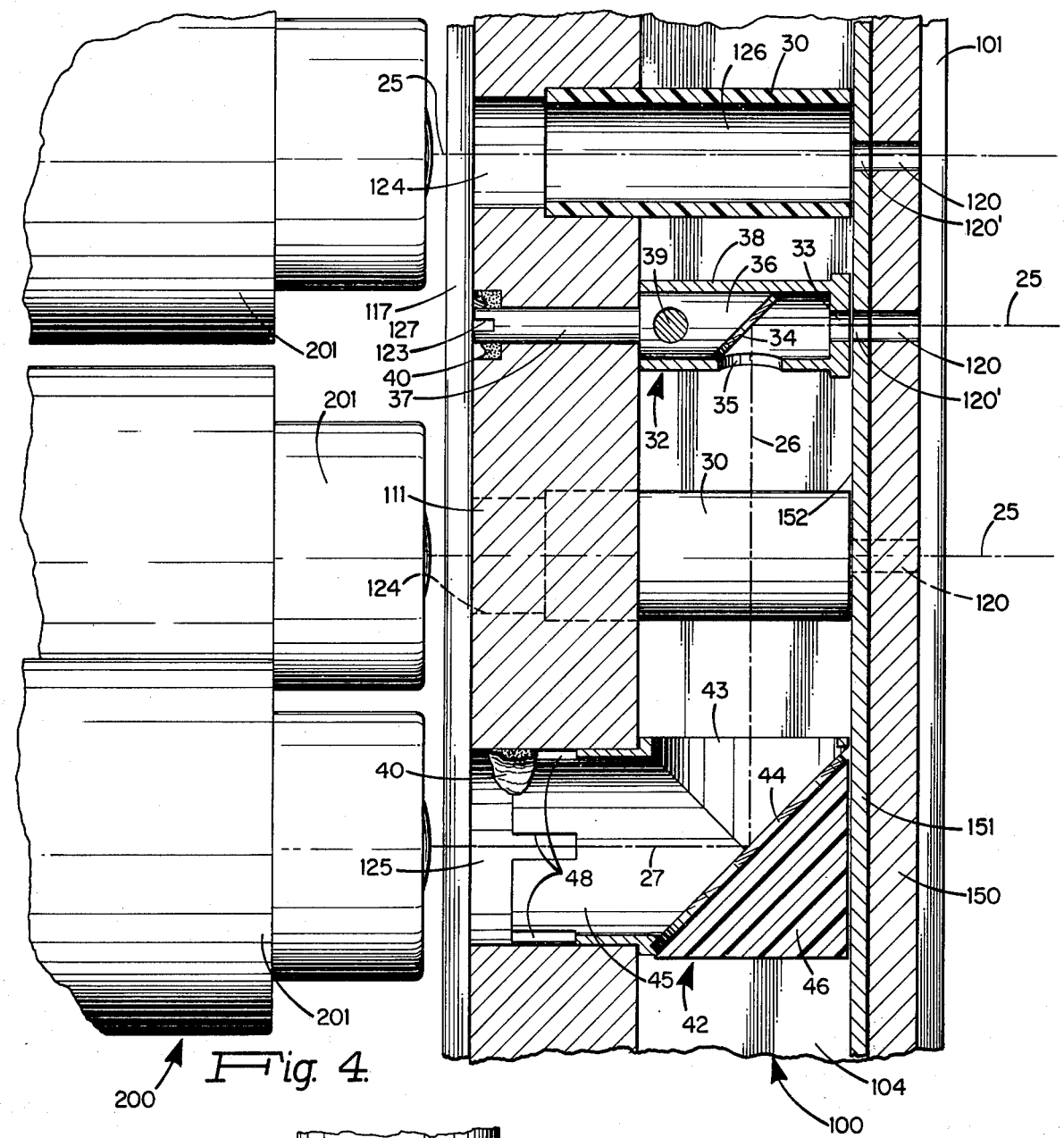
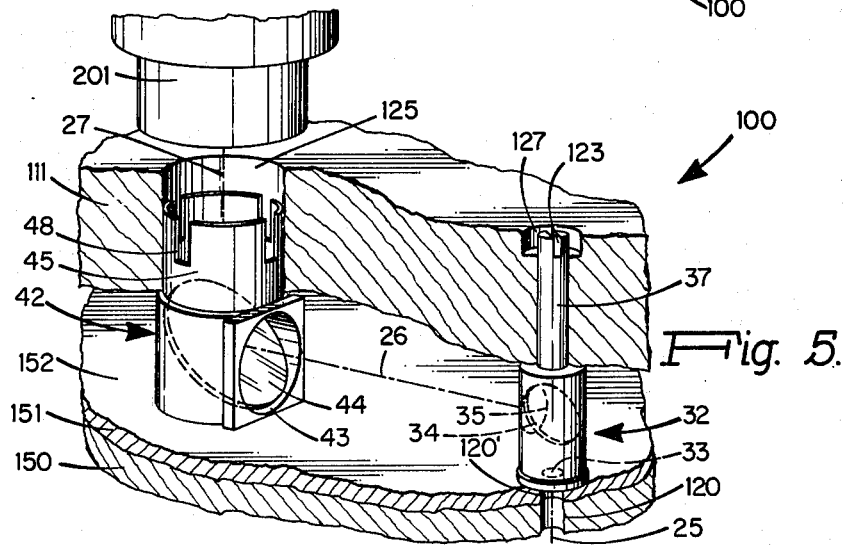

SPECTROMETRIC SYSTEM AND CASSETTE

BACKGROUND OF THE INVENTION

Emission spectrometers are useful for both qualitative and quantitative analyses. Typically, a spectrometer comprises: an energy source, such as a plasma jet, into which the sample to be analyzed is introduced to provide a spectral energy distribution of the elements characteristic of the sample; an optical resolution system to distribute and display the emission spectra onto a focal plane; and a detector system to detect and measure the radiant intensity and wave length of the observed spectra, whereby the identity and, if desired, the amount of each element in the sample may be determined. Optionally and conventionally, the spectrometer system may also contain various processor systems for processing the information received by the detector, and a display system to display or print out the processed results.

One spectrometer device known as an echelle-prism spectrometer, which provides for the focusing of the horizontal and vertical components of the spectra at the exit focal plane of the spectrometer, is described in U.S. Pat. No. 3,658,423, issued Apr. 25, 1971, hereby incorporated by reference.

A variety of different means may be used to detect the spectra; however, in most spectrometer systems, the detectors are photomultiplier tubes (PMT), since at present the PMT provides the best signal/noise ratio (S/N) for the detecting of elements; for example, in the 2000 to 8000 A spectral region. Often, two PMTs of different range of sensitivity are used to cover the desired spectral range.

Detection may comprise the use of a single PMT in a sequential mode, wherein each element in the spectra to be analyzed is detected individually and sequentially in time, with adjustments made in the exit slit each time to optimize the S/N ratio and the sensitivity of the spectrometer. Detection may also comprise the employment of a plurality of PMT for simultaneous multielement detection. In the multielement detection system, an array of PMT is employed behind the focal plane of the spectra, with the single slit in the focal plane replaced by a fixed pattern of exit slits. The fixed pattern of exit slits provides a fixed average optimum position for the number (N), for example, up to 20 spectra lines of interest. The exit slits positioned in the focal plane correspond to wave length characteristics of the elements to be detected.

One multielement system employs a cassette which has a fixed pattern of exit slits in the face panel of the cassette relative to the elements to be determined, which face panel is placed in the exit focal plane of the spectrometer. The spectral energy proceeds through a direct channel in the cassette and impinges directly on an aligned PMT on the other side of the cassette, with typically one PMT used per cassette channel. The signals of the PMTs are then compiled, processed and displayed.

The multielement system is satisfactory for the detection of elements which are characterized by widely divergent emission spectra and exit slits; for example, elements like gold and silver. However, the multielement system provides a significant problem wherein the elements to be detected give spectral emission lines which have exit slits and wave lengths closely spaced together, such as, for example, in the detection of mixtures containing boron, tungsten and iron and many other combinations of elements.

PMTs have a finite size and, where spectral lines are close together, PMTs cannot be stacked or arranged together beyond such size limitations. Accordingly, where the spectral lines are close together as, for example, less than 100 or 10 Angstrom (A) units apart, separate PMTs cannot be positioned and aligned to receive the spectral energy of such closely positioned elements, particularly with the echelle spectrometer of U.S. Pat. No. 3,658,423. Thus, the multielement system cannot be used to detect such elements with PMTs with a multielement cassette. Therefore, there exists a need for an effective spectometric system and cassette and method of operation to permit the simultaneous spectrometric detection and determination of elements in a sample where the element spectral lines are close together.

SUMMARY OF THE INVENTION

My invention relates to an improved spectrometer system, to a cassette for use in such system, to a method of directing spectral radiation through the cassette, and to a method of detecting multiple elements in a sample to be analyzed.

More particularly, my invention concerns an echelle spectrometer system with a horizontal and vertical dispersion pattern, an interchangeable cassette for use in the system, with each cassette adapted to be positioned in a fixed position, to a method of directing spectral radiation from the focal plane of the spectrometer and falling on a fixed pattern of slits in the cassette to an array of photomultiplier tubes behind the focal plane, and to a method of detecting multiple elements whose spectral lines are closely spaced together.

My invention comprises an improved spectrometric system employing a cassette, and particularly an interchangeable cassette, which permits the detection of one or a plurality of elements, regardless of how close the spectral lines of the elements to be detected are positioned. My cassette includes optical transmission means therein which provide for the transmission and distribution of spectral energy from the focal plane of the spectrometer on the face surface of the cassette to detectors adjacent the back surface of the cassette, particularly to an array of PMTs located behind the focal plane.

My invention permits the simultaneous determination of a plurality of elements with the use of a single cassette with a plurality of fixed slits or openings therein; that is, to use a multichannel technique without the difficulty or restrictions regarding the size and location of the PMTs.

Whereas in the sequential mode of operation, for example, by dialing or selecting the diffraction order and the wavelength within the selected order, it is possible to choose the most appropriate line image of interest, in the multichannel approach there is no need of such dialing or selection. The spectrometer is "peaked" in the average optimum position for the N; e.g., up to 20 or more lines of interest to be selected.

The spectral energy spots, corresponding to the N slits, randomly located in the focal plane, are correlated to the orderly position of the PMTs via an optical translator or transmission means in the cassette. This transmission means consists of a multiplicity of small periscopes with mirrors of different size and angles. The optical translator is inserted from the top between the focal plane and the front face of the head-on PMT array.

The optical transmission means of the cassette is limited by the mirror losses; however, such losses are low, and optical transmission values in the vicinity of 75% or more are obtained in comparison to fiber optics which are far less efficient.

In my cassettes, covering a particular selection of 20 elements, no measurable cross-talk between channels or additional losses due to other problems have been encountered. Each cassette contains the appropriate fixed pattern of slits relative to the elements (N) under consideration, so that each cassette has all the necessary elements for aligning the selected (N) energy spots, each with its own PMT detector.

Of course, the spectrometric system could have more than one cassette, and particularly interchangeable cassetts are used. For example, a set of cassettes could be used, each being specific to a given analysis, such as for particular trace elements in water, oils or other matrices.

My invention comprises a cassette for use in a spectrometer system, the cassette adapted to receive spectral energy on its face surface, and to transmit such energy therethrough and to a detector adjacent the back surface, which cassette comprises: a face mask plate having at least one inlet opening therein to receive spectral energy, the face plate adapted to be placed in the focal plane of a spectrometer; a back plate spaced apart from and generally parallel to the face plate, and having at least one outlet opening therein to transmit spectral energy received by the inlet opening to a detector, the outlet opening being nonaligned with the inlet opening; and optical transmitting means within the cassette which comprises a first reflecting mirror adjacent the inlet opening and positioned to receive spectral energy and to direct angularly the received energy, and a second reflecting mirror adjacent the outlet opening and positioned to receive the spectral energy from the first mirror and to transmit the received energy to the outlet opening, whereby spectral energy from a spectrometer focal plane is directed through nonaxially aligned inlet and outlet openings of a cassette to a detector.

My cassette comprises in one embodiment a universal face plate with a large plurality of openings; e.g., up to 20o, and a face mask plate having a plurality of selected openings; e.g., 10 to 20, which is affixed over the universal plate to mask the undesired openings. This arrangement permits the solution of mask plates for the elements to be detected in any particular matrix in the spectrometer by merely selecting and replacing the mask plate in the cassette. Typically, my cassette has a plurality of inlet and outlet openings, some of which are axially aligned and some of which are not axially aligned. My invention provides for the detection of those elements whose emission spectra are close together, and where the detecting means; e.g., the PMTs, could not physically be positioned to receive the emission spectra in an aligned manner.

Further, my cassette is constructed and arranged with a locator means so that the cassette may be rapidly and easily inserted into the correct and same position each time with the face in the focal plane of the spectrometer. My cassette is interchangeable in that in one embodiment a locator member, such as a bayonet member, fixed to the cassette is slidably engaged in a locator-receiving member, such as a bayonet-receiving slot, in the spectrometer to place the cassette in the correct position, and to permit the cassette to be removed easily therefrom and replaced with another or the same cassette with a different mask plate.

My cassette also provides for a means to arrange and adjust the exact position and alignment of the mask plate, and also for adjustment and alignment of the reflecting mirrors in the optical transmission means.

My invention also comprises the method of analyzing a sample in an emission spectrometer which comprises: placing a cassette having a multiplicity of aligned and nonaligned inlet and outlet openings in the focal plane of the spectrometer, and preferably fixing and locating the cassette in a fixed, interchangeable and secured position; transmitting the emission spectra received by the inlet openings to the outlet openings by a reflection of at least a portion of the spectra by mirrors; and detecting the emission spectra from the outlet opening, for example, by a plurality of fixed PMTs.

My invention will be described for the purpose of illustration only in connection with an echelle spectrometer with an $x$–$y$ diffraction pattern, and with a particular embodiment of the cassette. However, it is recognized and is within the spirit and scope of my invention that my cassette may be profitably employed with other spectrometers and in and with other instruments where the physical positioning of a detecting or radiant-energy-receiving means is a problem.

BRIEF DESCRIPTION OF THE DRAWINGS

FIG. 4 is an enlarged cross-sectional view of my cassette illustrating the optical transmitting means in the cassette.

FIG. 5 is an enlarged partial cross-sectional and perspective view illustrating the adjustment of the optical transmitting means of my cassette.

DESCRIPTION OF THE EMBODIMENTS

Figure 1:
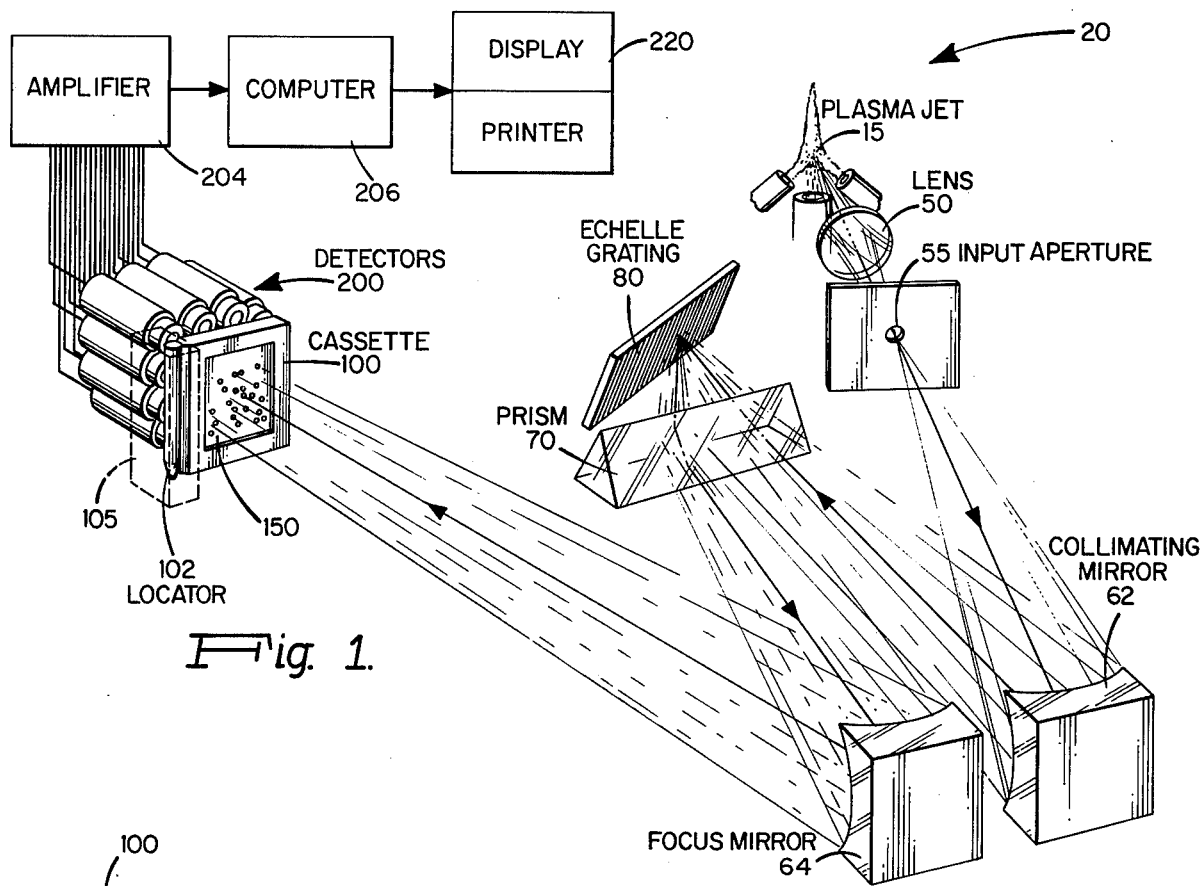
FIG. 1 is a partially schematic and perspective view of a spectrometer system employing my cassette.

FIG. 1 illustrates a spectrometer system 20 employing my cassette 100, which system comprises a plasma jet 15 as an emission source for a sample to be analyzed, the emission being directed through a collimating lens 50 and to input aperture 55 in an aperture plate. The emission from the aperture 55 falls in a first collimating mirror 62 which reflects and directs the emission through a rotatable prism 70 for order separation of the emitted radiation in the vertical ($y$) direction and to a rotatable echelle grating 80 and through prism 70 for order separation in the horizontal ($x$) direction, so that an $x$–$y$ diffraction pattern is obtained. A focus mirror 64 receives the pattern and focuses the pattern in a focal plane in which the front face mask plate 150 of my cassette 100 is placed. Cassette 100 has secured to one side a smooth elongated bayonet locator 102 with tapered sides 103 (FIG. 3) to prevent rotation of the cassette, which slidably fits into a mating receiver slit in a positioned receiver 105 to secure the cassette in a fixed and the same position after each use with the face mask plate 150 positioned in the focal plane.

A bank of fixed photomultiplier tubes 200 to detect the emission spectra transmitted through the cassette 100 is positioned behind the cassette, and each PMT aligned with an inlet opening at the back of the cassette.

The PMTs receive the transmitted spectra radiation and convert and multiply the radiation to produce a multiplied signal. The signals are amplified by amplifier 204, the amplified signals sent to computer 206 for storage and analysis, and the results of such analysis are displayed on a screen and/or printed out in a printer 220. The optical flow path of the radiation in the spectrometer is illustrated in the drawing.

Figure 2:
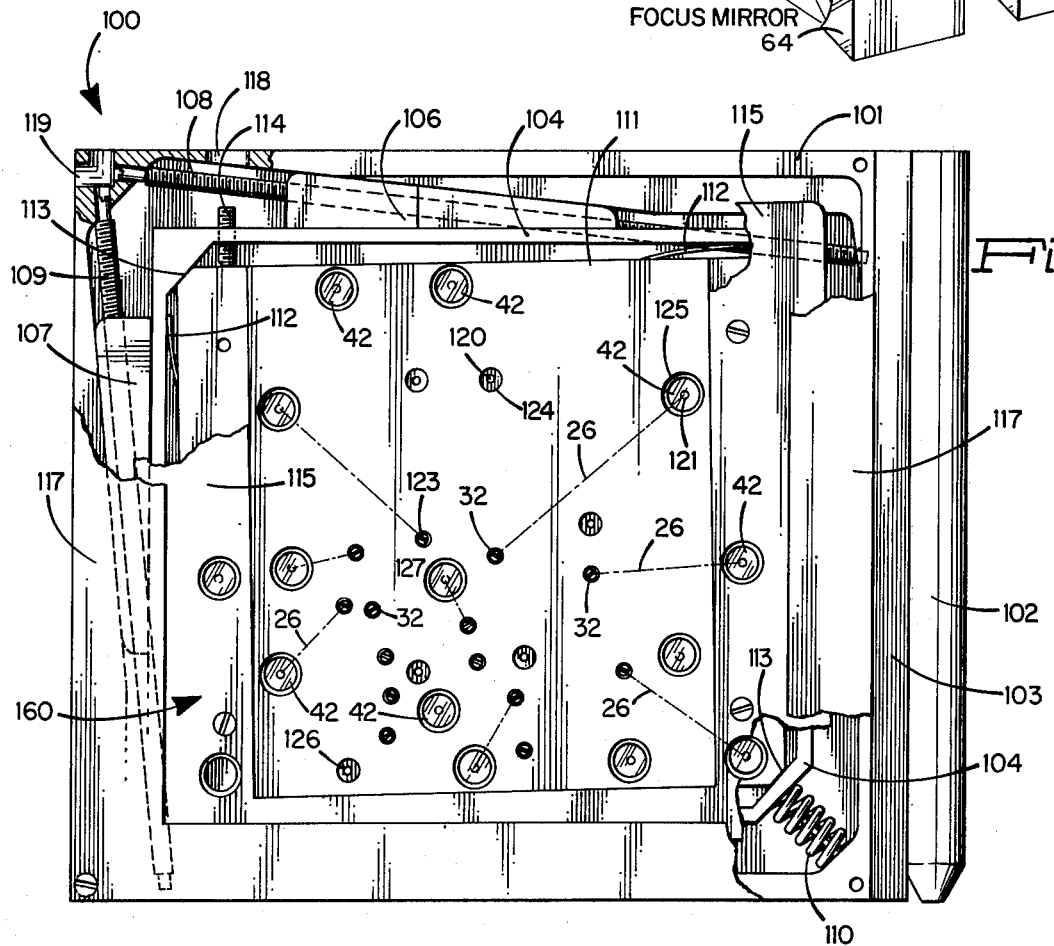
FIG. 2 is a rear face plan view in partial cross-section of my cassette illustrating the means to align my cassette.

FIG. 2 shows the rear face 160 of my cassette 100 which includes an outer housing frame 101 and an inner frame 104 resting at one corner against compression spring 110, which works against a locating wedge 106 having adjusting lead screw 108 which displaces and adjusts the frame 104 in a horizontal direction and locating wedge 107 with adjustable lead screw 109 which displaces and adjusts the frame 104 in a vertical direction. The heads of the lead screws 108 and 109 meet at part 119 to provide access to the screws for frame adjustment purposes. Chassis 111 rests within the inner frame 104, contacting the frame at corner contact surfaces 113 and at the chassis rotating corner springs 112, and is adjusted within the inner frame by adjusting screw 114 through access part 118, with outer access frame 117 confirming the inner frame of the cassette. The aforesaid construction provides for the adjustment of the cassette and the careful protection of the inlet and outlet openings.

In particular reference to FIGS. 2, 4 and 5, my cassette includes a plurality of both aligned and nonaligned inlet and outlet openings to direct emission radiation to the PMTs 201. My cassette includes a plurality of straight-through plastic tube light shields 30 which permit incoming monochromatic radiation shown by light path 25 to enter inlet openings 120 and 120' in the aperture face mask plate 150 and universal plate 151, and to pass directly through optical channel 126 to the particular PMT aligned and behind the outlet or exit opening 124.

FIG. 4 illustrates nonaligned inlet and outlet openings in my cassette wherein the PMT cannot physically be directed aligned in the optical light path, and my optical transmission means must be employed. My cassette includes an adjustable aiming mirror mount 32, an inlet aperture 33 to receive monochromatic light from inlet openings 120 and 120' as shown by light path 25, a small angularly positioned receiving mirror 34 aligned with aperture 33, the mirror 34 enclosed within an adjustable aiming mirror mount 38 and the mirror 34 on a metal base 36. The mount includes an exit aperture 35 in the base thereof wherein the incoming light beam 25 is received by mirror 34 and directed downwardly through aperture 35 as illustrated by light beam 26. Connecting pin 39 connects the base 36 to stem 37 which extends to the back surface of the cassette, and has a slit top 123 in an opening 127 with cement 40. The mirror 34 is aimed to direct the light beams 25 and 26 by adjusting the position of the mirror 34 on base 36 in mount 38. After adjustment of mirror 44 by slit 48, and as before, a drop of cement 40 may be employed to fix the correct mirror alignment. The position of the mirror 34 on base 36 in mount 38 is adjusted through turning slot 123 in stem 37 to the desired position, preferably during manufacture and construction of the cassette, and then fixing the mirror 34 when correctly aimed by applying a hardenable cement 40 to opening 127 to fix the stem in position and prevent the user from changing the adjustment. Of course, if desired, cement need not be applied, and the stem 37 left adjustable by the user.

Light beam 26 is directed to a second larger adjustable mirror 44 in mount 42 on a base 46, and through the receiving aperture 43 in the mount wherein the beam is directed by mirror 44 through beam path 27 in exit barrel 44 having adjusting slits 48 for adjusting and aiming mirror 44 through rotation of the mirror base 46, which rests on the surface 152 of plate 151 to permit the light beam 27 to exit through aperture 125 to the PMT 201 adjacent and aligned with the aperture.

In operation of my cassette, the optical transmission means with adjustable mirrors 34 and 44 permit the monochromatic light falling on the mask plate 150 in the focal plane to pass through mask and universal plate inlet openings 120 and 120' as beam 25 to mirrio 34 and to be reflected to mirror 44 through beam 26 and hence by beam 27 through outlet opening 125 to the PMT. Typically, my cassette has a plurality of such optical transmission means, depending on the elements to be determined, and the closeness of the spectral lines and the physical size of the detecting means employed. The detecting means illustrated are photomultipler tubes; however, my cassette and system are applicable with any detecting means where similar problems exist.

Figure 3:
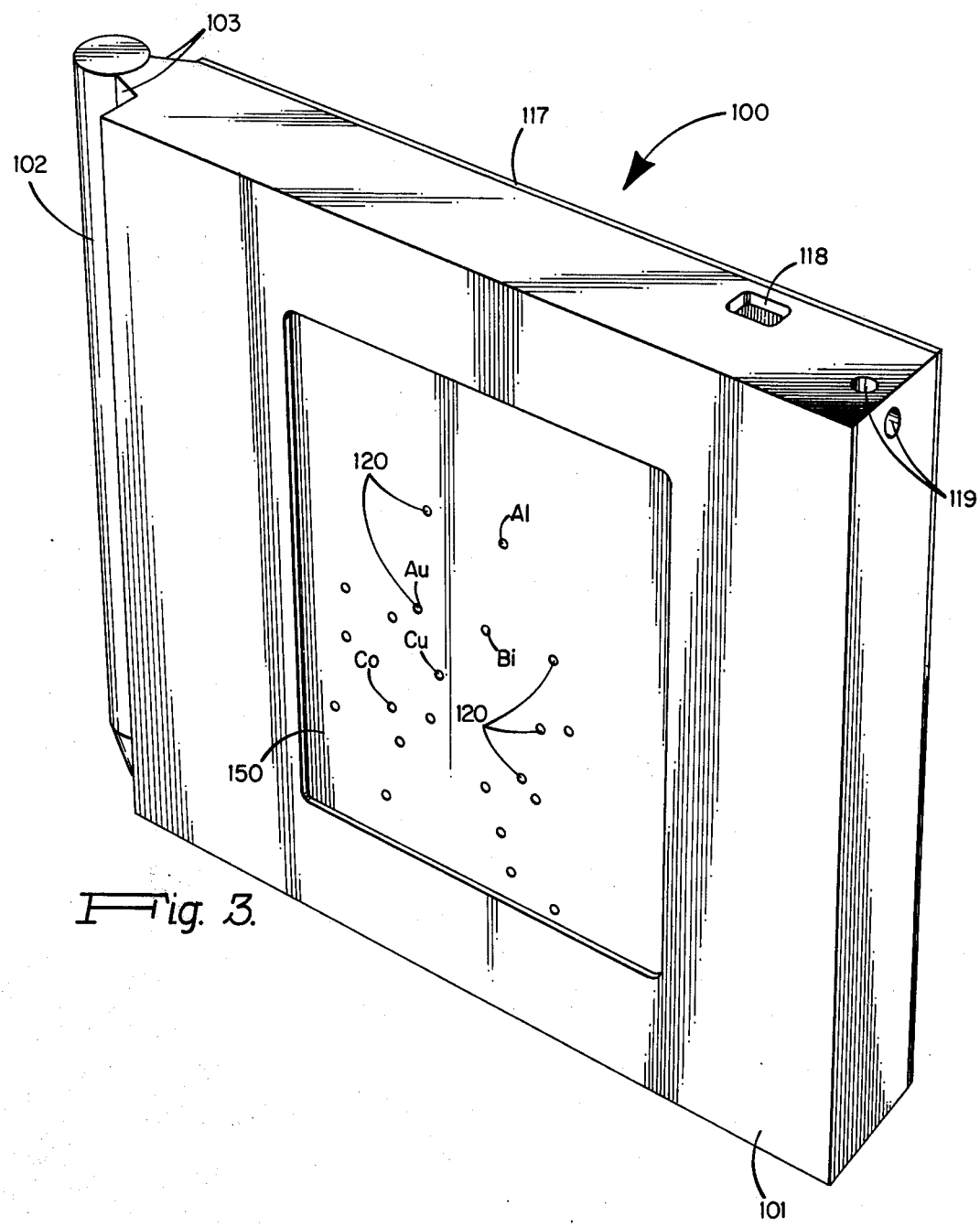
FIG. 3 is a perspective view of my cassette showing a particular face mask plate.

FIG. 3 shows a front plan view of my cassette 100 wherein certain of the inlet openings 120 are further identified by representation of certain elements in the mask plate 150 between outer housing 101 and frame 117. The view shows further the access parts 119 to lead screws 108 and 109 for adjustment and positioning of the inner frame and part 118 for access to rotational screw 114. Also illustrated is the bayonet locator 102 as part of the cassette frame with the bayonet secured by outwardly flanged surfaces 103 to prevent rotational movement of the cassette in locator 105.

My cassette and spectrometer system provide for a rapid and effective multielement analysis and overcome the difficulties associated with the use and alignment of photomultipler tubes in such multielement analysis.

What I claim is:

1. A cassette for use in a spectrometer system, the cassette adapted to receive spectral energy on its face surface and to transmit such energy therethrough and to a detector adjacent the back surface, which cassette comprises:
   a. a face mask plate having at least one inlet opening therein to receive spectral energy, the face plate adapted to be placed in the focal plane of a spectrometer;
   b. a back plate spaced apart from and generally parallel to the face plate and having at least one outlet opening therein to transmit spectral energy received by the inlet opening to a detector, the outlet opening being nonaligned with the inlet opening; and
   c. optical transmitting means within the cassette which comprises,
      i. a first reflecting mirror adjacent the inlet opening and positioned to receive spectral energy and to direct angularly the received energy, and
      ii. a second reflecting mirror adjacent the outlet opening and positioned to receive the spectral energy from the first mirror and to transmit the received energy to the outlet opening, whereby spectral energy from a spectrometer focal plane is directed through nonaxially aligned inlet and outlet openings of a cassette to a detector.

2. The cassette of claim 1 for multielement analysis which includes:

a. a face mask plate and a back plate defining a plurality of aligned and nonaligned inlet and outlet openings;
b. a plurality of channels, each connecting an aligned inlet and outlet opening for the direct transmission of emission energy therethrough; and
c. a plurality of optical transmitting means, each connecting a nonaligned inlet and outlet opening for the indirect transmission of emission energy to the outlet openings.

3. The cassette of claim 1 which includes means to locate the cassette in a fixed position in the focal plane of a spectrometer.

4. The cassette of claim 1 which includes means to adjust the position of the first or second mirrors.

5. The cassette of claim 2 which includes:
a. an outer frame;
b. an inner frame within the outer frame and to which is secured the face and back plates; and
c. means for adjusting the position of the inner frame member in both horizontal and vertical directions with the outer frame to align the inlet openings of the cassette with the pattern of the emission spectra in the focal plane.

6. The cassette of claim 5 wherein the means for adjusting includes inclined plane surfaces displaced between the inner and outer frames, one in vertical and the other in a horizontal direction, threadable means to displace the inner frame on such inclined surfaces to adjust the position of the face mask and back plate, and spring means affixed between the inner and outer frames at one corner thereof to store or release energy as the adjustment is made.

7. The cassette of claim 2 which includes a universal plate having a greater plurality of inlet openings than the inlet openings of the face mask plate, the openings of the face mask plate adapted to fit over and encompass some of the openings in the universal plate, the universal plate positioned directly behind the face mask plate, thereby permitting various face mask plates to detect certain elements to be used with the universal plate for all elements to be detected.

8. An emission spectrometer system for the detection of elements, wherein a diffraction pattern of emission spectra is displayed in a focal plane, which comprises:
a. the cassette of claim 1 with the face mask plate positioned in the focal plane; and
b. means to detect spectral energy from the outlet opening of the transmission means.

9. An emission spectrometer system for the detection of elements, wherein a diffraction pattern of emission spectra is displayed in a focal plane, which comprises:
a. the cassette of claim 2; and
b. a fixed array of photomultiplier tubes to detect the spectral energy from the outlet opening, the photomultiplier tube positioned behind the back plate and adjacent each outlet opening from which energy is emitted.

10. The spectrometer system of claim 9 wherein the spectrometer comprises:
a. a cassette of claim 2 which includes a bayonetlike locator element affixed to one side of the cassette; and
b. locator positioning means in the spectrometer system adjacent the focal plane to secure and receive the locator element.

11. The spectrometer system of claim 9 which includes:

a. a plasma jet to excite a sample; and
b. a spectrometer which includes a rotatable echelle grating and a prism to provide for a horizontal and vertical diffraction pattern of the spectral emission energy in the focal plane.

12. A cassette for use in a spectrometer system for the detection of multielements by analysis of emission spectral energy in a focal plane of the spectrometer, which cassette comprises:
a. a plurality of nonaxially and axially aligned channels, each channel adapted to receive spectral emission energy and to pass the energy therethrough, each channel having an inlet and outlet opening, the inlet opening in one plane and adapted to be placed in the focal plane of an emission spectrometer; and
b. optical transmission means to direct the spectral energy from the inlet to the outlet openings of the nonaligned channels.

13. The cassette of claim 12 wherein the optical transmission means include first and second angularly positioned reflecting mirrors and means to adjust threadably the position of such mirrors substantially parallel to the aligned channels.

14. A spectrometer system having a vertical-horizontal diffraction pattern of spectral energy in a focal plane which comprises:
a. a fixed array of photomultipler tubes to detect the spectral emission energy of multielements; and
b. the cassette of claim 12 placed in the focal plane of the spectrometer, a photomultiplier tube positioned behind each outlet and adapted to receive spectral energy therefrom.

15. A cassette for use in a spectrometer system which comprises:
a. a base plate having a side tapered to adapt closely into a first compatible groove means in the spectrometer in which the cassette is to be used, and defining a multiplicity of aligned and nonaligned channels passing therethrough, each channel having an inlet and an outlet opening for passing radiation therethrough;
b. a mask plate defining a multiplicity of openings equal to or less than the number of aligned and nonaligned channels of said base plate and disposed directly behind said base plate, each of which openings is to an inlet of said channels;
c. a frame member disposed substantially about said base plate and said mask plate, and having adjacently inclined planar surfaces contacting said base plate;
d. a pair of threaded displaceable block elements disposed on adjacent sides of said frame member and cooperating with inclined planar surfaces of said frame member and with the outer surface of said base plate to adjust the position of said base plate in the latitudinal and longitudinal directions;
e. a pair of set-screw means adapted to transfix said frame member and to cooperate with a said threaded displaceable block and to displace said blocks as said set screws are threaded in and out;
f. a spring means affixed to said frame member opposite the apex of said threaded displaceable block elements, and arranged to store or release energy as said set screws are threaded in and out;
g. a bayonet-shaped element adjacent said tapered side of said base plate which is adapted to fit into the compatible groove in said spectrometer;

h. a first mirror reflector having a pin and screw mechanism means to adjust said first reflector in a direction substantially parallel to said channels, adjustably mounted within said nonaligned channels and arranged to receive radiation from the inlet of said channel; and i. a second mirror reflector mounted within said nonaligned channel and arranged to receive radiation from said first reflector and to direct said radiation to the outlet of said channel.

16. A method of analyzing a sample containing a multiplicity of elements to be detected in an emission spectrometer in which a pattern of spectral emission energy of such elements is displayed in a focal plane of the spectrometer, which method comprises:

a. fixedly positioning a cassette having a plurality of both aligned and nonaligned channels therein with inlet and outlet openings for each channel in the focal plane of the spectrometer so that the inlet opening receives spectral energy thereon;

b. passing the spectral energy from the inlet openings to the outlet openings of each channel and in the nonaligned channels by transmitting the energy by reflection to the outlet openings; and c. detecting the elements in the sample by positioning photomultiplier tubes adjacent each outlet opening of the elements to be detected.

17. The method of claim 16 which includes detecting those elements in the sample whose spectral emission energy wavelengths are positioned closely together in such a manner and pattern in that photomultiplier tubes cannot be positioned directly in the axially energy path of such elements.

* * * * *